March 6, 1962     F. W. BAILEY     3,023,955
ONE-HAND OPERATED SLIDE RULES
Filed Oct. 24, 1957
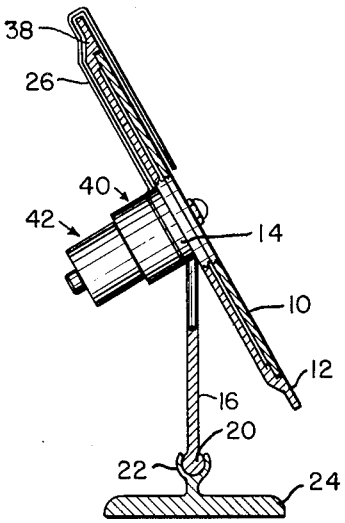
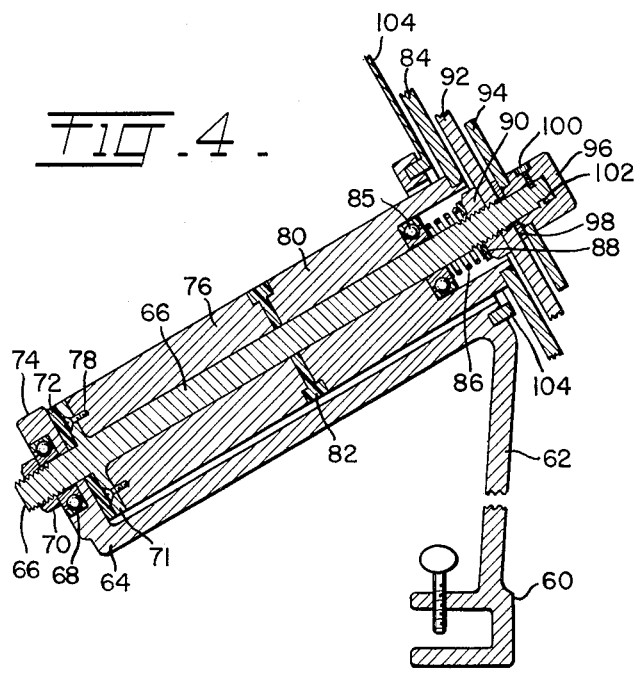
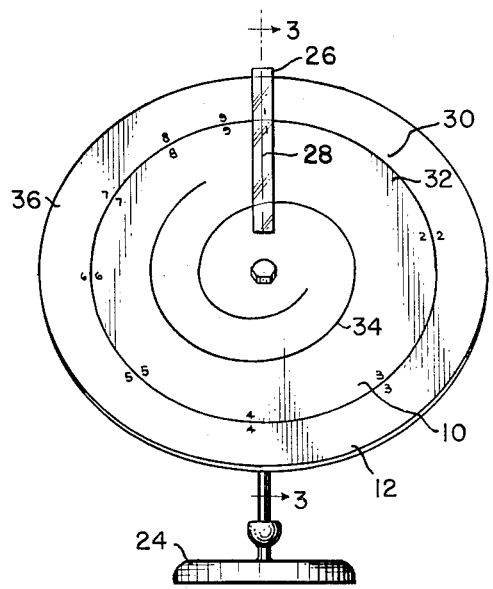
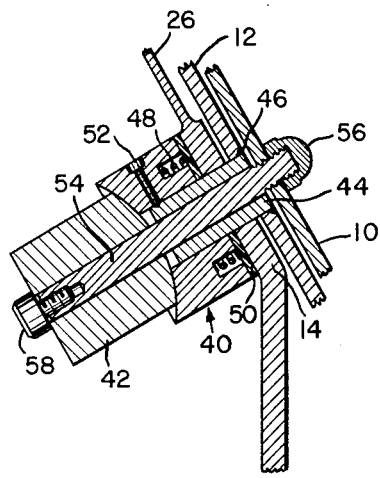
INVENTOR.
FRANK W. BAILEY
BY
ATTORNEY 3,023,955
Patented Mar. 6, 1962

3,023,955
ONE-HAND OPERATED SLIDE RULES
Frank W. Bailey, 663 Black Oak Ridge Road, Wayne, N.J., assignor of fifty percent to John J. McGlew, Hasbrouck Heights, N.J.
Filed Oct. 24, 1957, Ser. No. 692,167
6 Claims. (Cl. 235—84)

This invention relates in general to calculating devices and particularly to new and useful improvements in a circular type slide rule calculating device mounted on a fixed support and capable of operation with one hand.

Previously one-hand operation of slide rules has been accomplished by complicated mechanisms such as an arrangement to key one indicating scale to another for movement together only at times when the multiplication or division manipulation required such keyed movement for a successful solution, and effecting unkeyed scale movement at other times. In still other types of mounted one-hand operated rules, projections or handles have been provided on the face of indicating scales to permit one hand sliding of the scale having the handle attached thereto while the rest of the parts are held stationary on the mount. Such apparatus are difficult to operate and require complicated and expensive parts.

The present invention provides a mounted circular-type slide rule having two or more movable scales which may be moved independently or together by a simple knob or dial mechanism. Complete slide rule manipulations may be accomplished by moving one or two co-axially arranged dials by one hand. The arrangement is such that the index and scale readings are made at a convenient easily readable location such as at the top of the rule. The rule may be tilted for use of scales on the reverse side as well.

Accordingly it is an object of this invention to provide an improved one hand operated mounted circular slide rule. A further object is to provide a calculating device which is simple in design and economical to manufacture and rugged in construction.

In this specification and in the accompanying drawings, there are described and shown various embodiments of the apparatus of my invention and various modifications thereof are indicated, for it is to be understood that these are not intended to be exhaustive nor limiting of the invention, but on the contrary are given for the purposes of illustration in order that others skilled in the art may fully understand the invention and the manner of applying the apparatus for manufacturing an improved calculating device and components thereof, and so that they may modify and adapt the invention in various forms, each as may be best suited to the conditions of a particular use.

The various objects and advantages of the present invention will be more fully understood from a consideration of the following specification in conjunction with the accompanying drawings in which:

FIG. 1 is a side elevation partly in section of a mounted circular slide rule constructed in accordance with this invention;

FIG. 2 is a front elevation of the slide rule shown in FIG. 1;

FIG. 3 is an enlarged vertical section taken on the line 3—3 of FIG. 2; and

FIG. 4 is a fragmentary side elevation partly in section showing another embodiment of the invention.

Referring to the drawings in particular, the invention embodied therein includes a circular or disk-type mounted slide rule having in this instance two rotatable dials or disks, an inner small-diameter one 10 and an outer large-diameter one 12, both mounted for rotation on a flat bearing surface 14 of an upstanding member 16. The dial 12 is dish-shaped, and the inner dial 10 is arranged to rotate within the indented central portion of the outer dial. A small annular area on the opposite face of the large diameter dial 12 bears against the surface 14 during rotation. In FIG. 3, the dials 10 and 12 and the bearing surface 14 are shown spaced apart for clarity, but in reality they are in contact.

The upstanding member 16 is provided with a ball-shaped end 20 which fits into a socket 22 of a heavy base member 24. In some instances it is desirable to replace the base member with a desk clamp or screw attachment fixture. Affixed to the top edge of the bearing surface 14 of the upstanding member 16 is an indicator or index piece 26. The index piece 26 extends upwardly around the edge of the large diameter dial 12 and downwardly over the face of both dials to a location spaced slightly from the center thereof. A hairline indicator 28 is provided on the index piece 26 for accurate scale reading.

The large dial 12 and the small dial 10 are advantageously provided with logarithmic scales 30 and 32, respectively, which are arranged in a clockwise progression along annular areas adjacent the edge of the small dial. The scales 30 and 32 are comparable to the "C" and "D" scales of the usual slide rule. In addition to either a "C" or a "D" scale, the small dial 10 is provided with a log-log scale arranged in a spiral toward the center thereof. The larger dial 12 is also provided with a scale 36 along the outer rim which may be comparable to the "CF" scale of the usual slide rule. In some instances for easy slide rule operation and reading it may be desirable to place the log-log scale 34 on the outer ridge of the larger diameter dial 12. Additional scales such as trigonometric and log function scales are advantageously provided on the back of the dial 12, and these may be read with the hairline 28 which extends across the back face of the large dial on the index piece 26.

It is appreciated that while the dials 10 and 12 have been indicated and described as flat disks the invention is equally applicable to other geometricaly shaped dials such as drum and cylinder type dials with indicia imprinted on the outer edges of the dials rather than on their end faces.

In accordance with the invention the dials 10 and 12 are maneuvered by the fingers of one hand using a pair of co-axially arranged knobs or cylindrical handles, an inner two-dial movement knob 40 and an outer one-dial movement knob 42.

The inner knob 40 has a hollowed cylindrical central portion which is slide-fitted onto an elongated sleeve member 44, which extends through an opening in the bearing surface 14 and is secured to the large dial 12 as by brazing as at 46.

The inner two-dial movement knob 40 is provided with an annular slot in the face adjacent the bearing surface 14 which holds a resilient device such as a compression spring 48. The knob 40 is slideably fitted onto the sleeve 44, and the spring is compressed against a driving washer 50 fitted onto sleeve 44 adjacent the bearing surface 14 until the desired turning drag on the knob 40 is obtained. Once the correct spring compression is obtained the knob 40 is held in a fixed position by a set screw 52, which is threaded into the knob and bears against the sleeve 44.

The outer one-dial movement knob 42 is provided with a convex face which abuts against a similarly curved but concave outer face of the knob 40. The knob 42 is hollowed and splined at the center, and is slideably fitted onto a long hollow splined sleeve 54 for rotation therewith. The sleeve 54 is threaded onto the small dial 10 at its opposite end and held thereon as by a lock nut cap 56. The end of the sleeve 54 adjacent the outer face of the knob 42 is threaded internally to receive an adjusting screw 58. The adjusting screw 58 abuts against the outer face of the knob 42, so that tightening of the screw effects tightening of the fit of the convex face of the knob 42 against the concave face of the knob 40. The adjustment is such that rotation of the knob 42 by hand contact therewith will not effect the rotation of the knob 40, however rotation of the knob 40 by contacting and turning this knob with the fingers will effect turning of the knob 42 as well, due to the driving force backwardly to this knob. This is accomplished by making the drag force between the knob 40 and the bearing surface 14 greater than the drag force between the knobs.

The rule is operated to perform a multiplication, for example, by rotating the two dial knob 40 to rotate both dials 10 and 12 to bring one of the multipliers on the scale 30 into alignment with the hairline 28. The one dial knob 42 is then rotated to move the dial 10 independently until the index is in alignment with the multiplier on the scale 30 and in alignment with the hairline. The result is found on the scale 30 above the second multiplier when the two-dial knob 40 is rotated to rotate each dial to a position in which the second multiplier is in alignment with the hairline.

The rule is operated to perform a division by rotating the two-dial knob 40 until the dividend appears under the hairline on scale 30. The one-dial knob 42 is then rotated to bring the divisor on scale 32 under the hair-line and in alignment with the dividend of scale 30. The answer may then be read on either scale 30 or 32 by bringing the index of one scale under the hairline by moving the two-dial knob 40, and reading the opposite scale for the answer.

The embodiment shown in FIG. 4 includes a desk clamp 60 to which is affixed semi-rigid but bendable long cable 62 having a slide rule mounting bracket 64 at the upper end. The bendable cable 72 is provided to permit extensive movement of the slide rule device.

The back upstanding portion of the bracket 64 is drilled to receive a central elongated dial mounting shaft 66. The shaft 66 is rotatably mounted on the bracket 64 and is provided with a ball-bearing collar 68 held by a lock nut 70 for rotation in a bearing race in the backpart of the bracket 64. The shaft 66 is provided with an integral flanged disk 71 located close to the mounting end which rotatably engages a washer 72, adjacent a flat front surface 74 of the bracket 64.

A long cylindrical hollow two-dial operation knob 76 is fitted on the shaft 66 and secured thereon for rotation therewith as by set screws 78 which extend through holes drilled in the disk 71. The knob 76 is advantageously made from 3 to 5 inches long to permit the user to place the four fingers of his hand along its length for better operational control.

A similar long cylindrical hollow one-dial operation knob 80 is slideably fitted on the shaft 66 and abuts against a smooth faced alignment washer 82, which in turn abuts against the knob 76. The alignment washer 82 is provided with a central annular area adjacent the shaft 66 of lesser thickness than the outside portion to permit interlocking operable rotating engagement of the knobs 76 and 80. An outer large diameter dial 84 similar to the dial 12 is affixed to the knob 80 and rotates therewith. The knob 80 is held in position on the shaft by a ball bearing 85 and biased against the washer 82 by a resilient means such as a compression spring 86. The spring is retained against the bearing 84 by a washer 88 which is adjustably locked in position by a nut 90.

A small diameter dial 92 similar to the dial 10, is affixed to the shaft 66 as by screw threads and is positioned with disk-shaped central portion of the outer dial 84 as in the previous embodiment. The mechanism is adjusted as by tightening the bolt 70 or the nut 90 to cause a smaller drag force from the knob 76 through the washer 82 to the knob 80, than from the knob 76 through the washer 72 to the bearing surface 74. Thus when knob 80 is rotated only the outer large diameter dial 84 is moved because the drag force on the knob 76 is not overcome, but when the knob 76 is moved both dials 82 and 92 are rotated.

It is to be noted that in this embodiment the larger diameter outside dial 84 may be moved independently but in the previous embodiment the inner small diameter dial 10 was arranged for independent movement.

In some instances it is desirable to provide an inner very small diameter dial for independent separate rotation. Such a dial 94 is affixed to a knob 96 and is rotatably mounted on the end of the shaft 66, spaced from the dial 92 by a washer 98. The knob 96 is provided with a screw 100 which rides in a key way 102 on the shaft 66. The dial 94 may be provided with any indicia desired and readings may be made by rotating the desired information into alignment with an index. The index on this embodiment includes a hairline arranged on an index piece 104 which is affixed to the bracket 64 and extends upwardly therefrom in a semi-circle around the knob 80 and around to the forward faces of the dials as in the previous embodiment.

The invention provides means for easy one hand slide rule operation either by using simply the thumb and index finger or by using all the fingers of one hand. The device may be tilted and moved to any convenient position from its mounting on the desk or table. Readings and manipulations may be made on either the front or back face and the readings may always be taken at a discernable vertical or 12 o'clock position. The device is inexpensive to manufacture and is ideal for continuous calculating and recording work.

From the foregoing it will be understood that the apparatus embodying the present invention described above are well suited to provide the advantages set forth, and since many possible embodiments may be made of the various features of this invention and as the method and apparatus herein described may be varied in various parts, all without departing from the scope of the invention, it is to be understood that all matter hereinbefore set forth or shown in the accompanying drawings is to be interpreted as illustrative and that in certain circumstances, some of the features of the invention may be used without a corresponding use of other features, or without departing from the scope of the invention.

What is claimed is:

1. A one-hand operated calculating device including a mounting stand, a large outer dial and a smaller inner dial each having indicia thereon and rotatably mounted on said stand, first hand operable knob means connected to said large outer dial, said stand including a support plate with said dials on one side and said knob means on the other second hand operable means connected to said smaller inner dial, first means effecting frictional drag between said first and second hand operable means, and second means effecting a greater frictional drag between said first hand operable means and said stand than between each said hand operable means.

2. A one-hand operated calculating device according to claim 1 wherein said second means effects a greater frictional drag between said second hand operable means and said stand than between each said hand operable means.

3. A one-hand operated calculating device including a mounting stand, a large disk-shaped member rotatably mounted on said mounting stand having a dished-out portion, a smaller disk positioned within the dished-out portion of said large disk-shaped member, a first knob connected to said large disk-shaped member, a second knob resiliently biased against said first knob with a lesser drag force than said first knob is biased against said stand, said second knob being operatively connected to said smaller disk, said stand including a support plate with said knobs on one side and said disk-shaped member on the other.

4. A calculating device according to claim 3 wherein a fixed index is attached to said mounting stand and extends across the exposed face of said large disk-shaped member and said smaller disk.

5. A calculating device according to claim 4 wherein said mounting stand has a pivotal portion.

6. A calculating device capable of operation with one hand comprising a mounting stand, first and second members having indicia thereon rotatably mounted on one side of said stand, a first operating knob connected to said first member rotatably mounted on the opposite side of said stand therefrom and in frictional engagement with said stand, and a second knob connected to said second disc and rotatably mounted on the same side of said stand as said first knob and in frictional engagement with said first knob, said stand including a support plate portion with said member on one side and said knob on the other, the friction between said first knob and said stand being greater than between said first and second knobs whereby rotation of said first knob by the fingers of the hand will be effective to rotate said first and second knobs and said first and second members, and rotation of said second knob by the fingers of the hand being effective to rotate only said second knob and said second member.

References Cited in the file of this patent

UNITED STATES PATENTS

| | | |
|---|---|---|
| 655,653 | Gnau | Aug. 7, 1900 |
| 801,538 | Milton | Oct. 10, 1905 |
| 1,042,755 | Beckett | Oct. 29, 1912 |
| 1,075,124 | Scheibli | Oct. 7, 1913 |
| 1,771,126 | Kelsea | July 22, 1930 |
| 2,177,176 | Gilmore | Oct. 24, 1939 |

FOREIGN PATENTS

| | | |
|---|---|---|
| 204,460 | Switzerland | Aug. 1, 1939 |